United States Patent
Evangelist et al.

(10) Patent No.: US 7,742,949 B2
(45) Date of Patent: Jun. 22, 2010

(54) SYSTEM AND METHOD FOR PROCESSING MEDIA REQUESTS

(75) Inventors: Shane N. Evangelist, Irving, TX (US); Joseph W. Craft, IV, Frisco, TX (US); Leslie D. Crook, Dallas, TX (US); John D. Taylor, Plano, TX (US); John F. Butler, Plano, TX (US)

(73) Assignee: Blockbuster Inc., Dallas, TX (US)

( * ) Notice: Subject to any disclaimer, the term of this patent is extended or adjusted under 35 U.S.C. 154(b) by 1318 days.

(21) Appl. No.: 11/172,731

(22) Filed: Jun. 30, 2005

(65) Prior Publication Data

US 2007/0005438 A1 Jan. 4, 2007

(51) Int. Cl.
G06Q 30/00 (2006.01)

(52) U.S. Cl. .................................................. 705/26

(58) Field of Classification Search ............. 705/26, 705/27, 37
See application file for complete search history.

(56) References Cited

U.S. PATENT DOCUMENTS

| | | | |
|---|---|---|---|
| 6,415,261 B1 | 7/2002 | Cybul et al. ............... | 705/14 |
| 6,584,450 B1 | 6/2003 | Hastings et al. ........... | 705/26 |
| 6,655,580 B1 | 12/2003 | Ergo et al. ................. | 235/375 |
| 6,868,403 B1 | 3/2005 | Wiser et al. ............... | 705/51 |
| 7,546,252 B2 | 6/2009 | Hastings et al. | |
| 2005/0060210 A1* | 3/2005 | Levi et al. ................. | 705/5 |
| 2005/0091164 A1* | 4/2005 | Varble ....................... | 705/52 |
| 2007/0050266 A1* | 3/2007 | Barber et al. .............. | 705/26 |
| 2008/0249843 A1* | 10/2008 | Gross ........................ | 705/10 |

OTHER PUBLICATIONS

Business Release, "Blockbuster Launches New Online DVD Rental Service," 4 pgs., Aug. 11, 2004.
Robert Barker,"Can Netflix Keep Spinning Gold?," BusinessWeek 112, No. 3829, English (Copyright 2003 McGraw-Hill, Inc.), 2 pgs., Apr. 21, 2003.
D.C. Wynn, P.M. Williams, M.G. Simons, N.F. Wilkins, A. Macrow, N.A. Dufty, A. Eng, M.J. Doherty, and D.M. Groves, "System and Method for Provisioning Audiovisual Works," U.S. Appl. No. 10/842,147, 37 pgs., May 10, 2004.
USPTO Office Action, U.S. Appl. No. 11/133,874, filed May 19, 2005, 10 pages, Sep. 15, 2009.

* cited by examiner

*Primary Examiner*—Mila Airapetian
(74) *Attorney, Agent, or Firm*—Baker Botts L.L.P.

(57) ABSTRACT

A system and method for processing media requests includes receiving a media request associated with a subscriber account. The availability of a slot associated with the subscriber account is determined. The slot includes at least one in-store slot and at least one on-line slot.

56 Claims, 4 Drawing Sheets

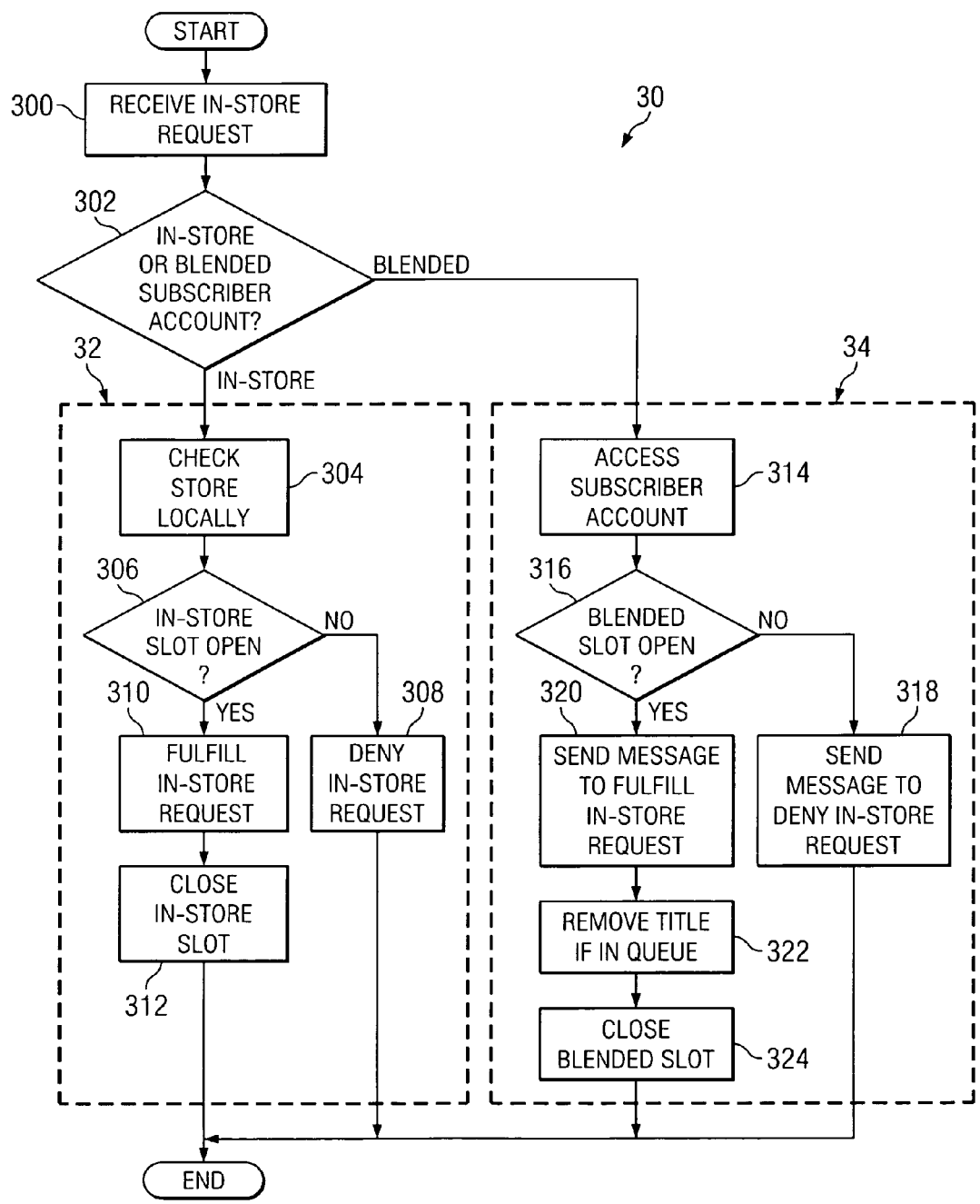

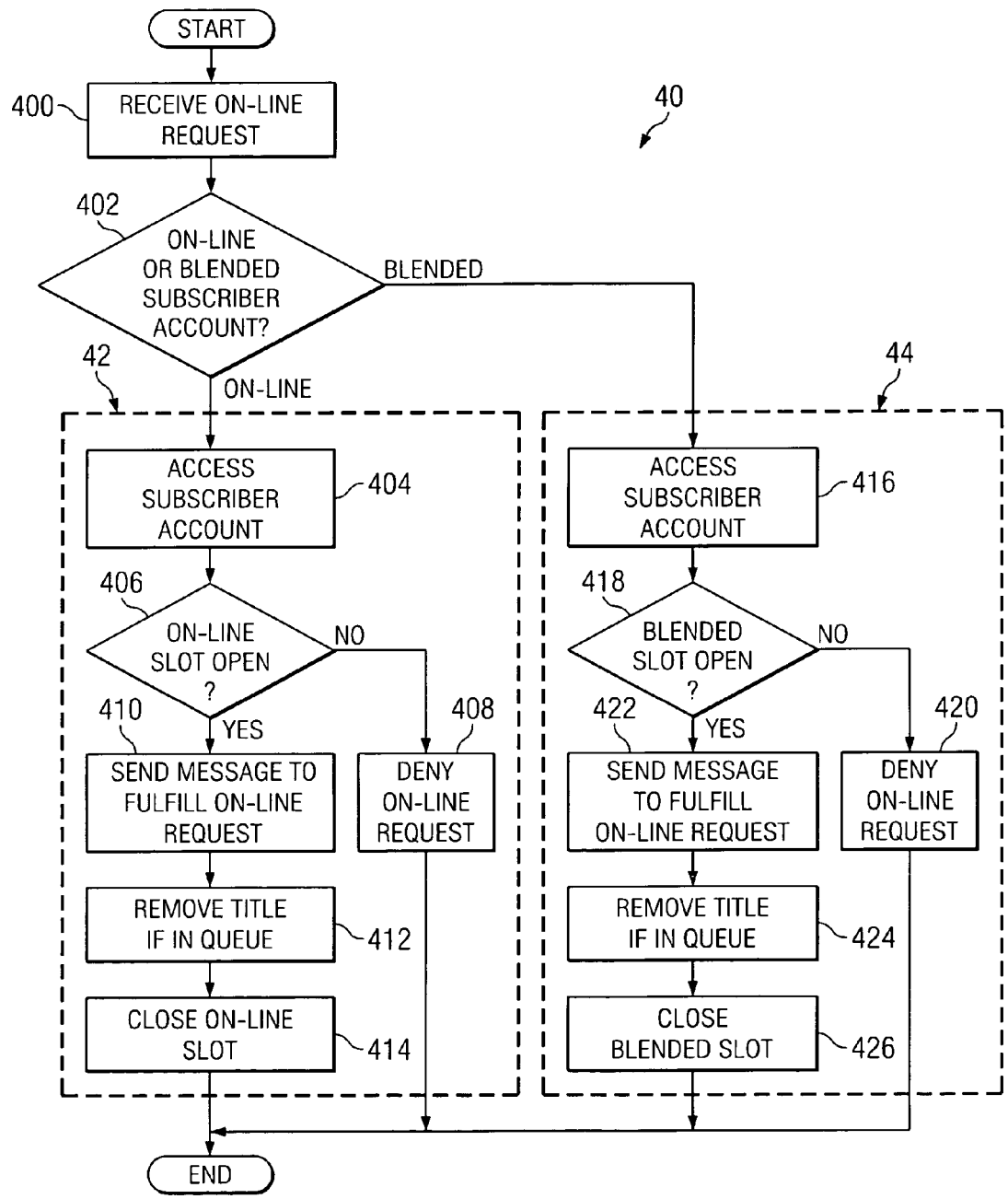

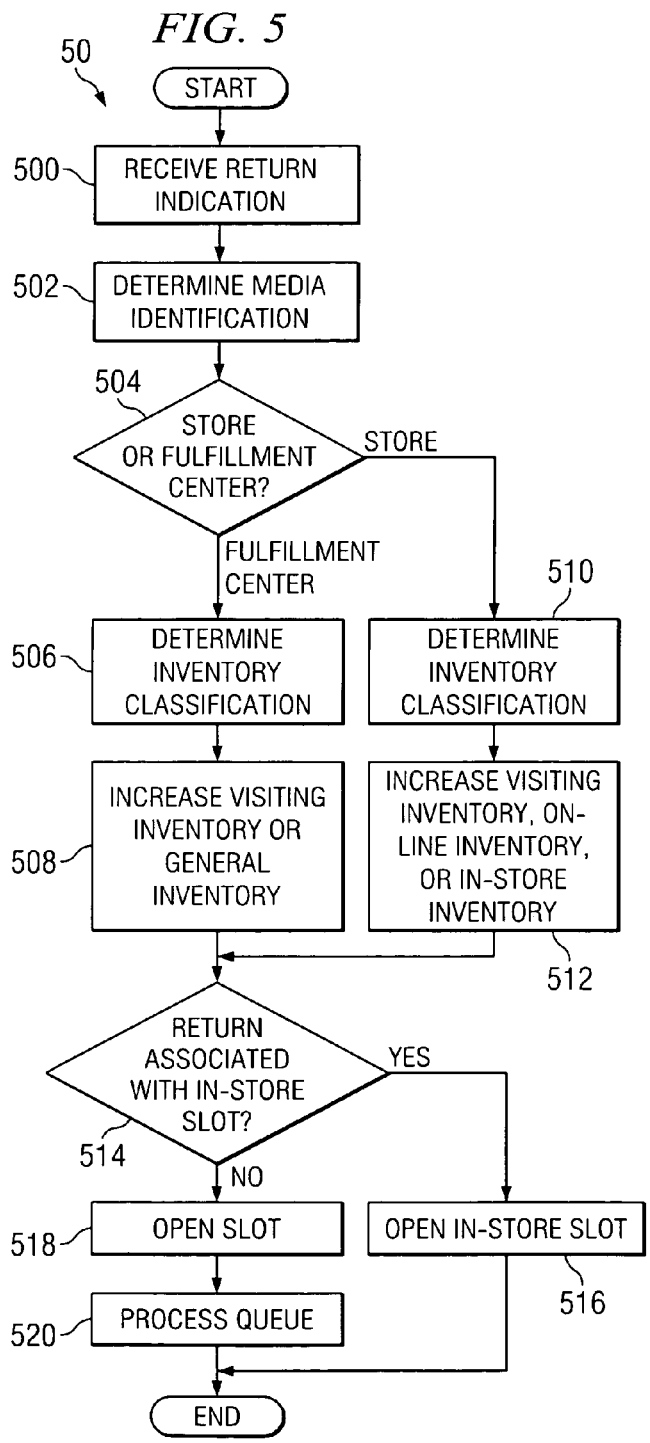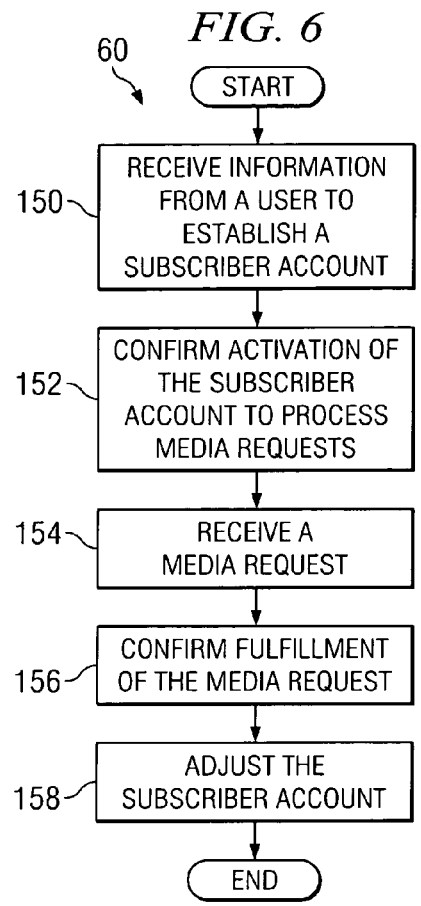

US 7,742,949 B2

SYSTEM AND METHOD FOR PROCESSING MEDIA REQUESTS

TECHNICAL FIELD OF THE INVENTION

This invention relates generally to the field of media, and more specifically to a system and a method for processing media requests.

BACKGROUND

Traditionally, the rental of audiovisual works, such as movies, involves visiting a local retail establishment, such as a video store. A user browses the store to select movies to rent, and completes the transaction through a traditional point-of-sale checkout. More recently, on-line subscription services provide alternative techniques for users to rent movies and for rental businesses to fulfill these rental requests.

SUMMARY OF THE DISCLOSURE

In accordance with the present invention, disadvantages and problems associated with processing media requests may be reduced or eliminated.

According to one embodiment of the present invention, a system and method for processing media requests includes receiving a media request associated with a subscriber account. The availability of a slot associated with the subscriber account is determined. The slot includes at least one in-store slot and at least one on-line slot.

Certain embodiments of the invention may provide one or more technical advantages. A technical advantage of one embodiment includes an efficient method and system for providing a user with rented media. The system analyzes various criteria to determine whether a user may receive rental items from a particular delivery channel. Users may have access to an in-store channel, an on-line channel, or a combination of in-store and on-line channels. Another technical advantage of an embodiment includes monitoring the activity of rentals and returns and adjusting the inventory based on the rental and return activity. Adjusting the inventory to meet user demand also promotes efficient operations and higher user satisfaction.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart for processing an in-store media request;

FIG. 4 is a flowchart for processing an on-line media request;

FIG. 5 is a flowchart for processing a media return; and

FIG. 6 is a flowchart for establishing a subscriber account to process media requests.

DETAILED DESCRIPTION OF THE DRAWINGS

Embodiments of the present invention and its advantages are best understood by referring to FIGS. 1 through 6, like numerals being used for like and corresponding parts of the various drawings.

Figure 1:
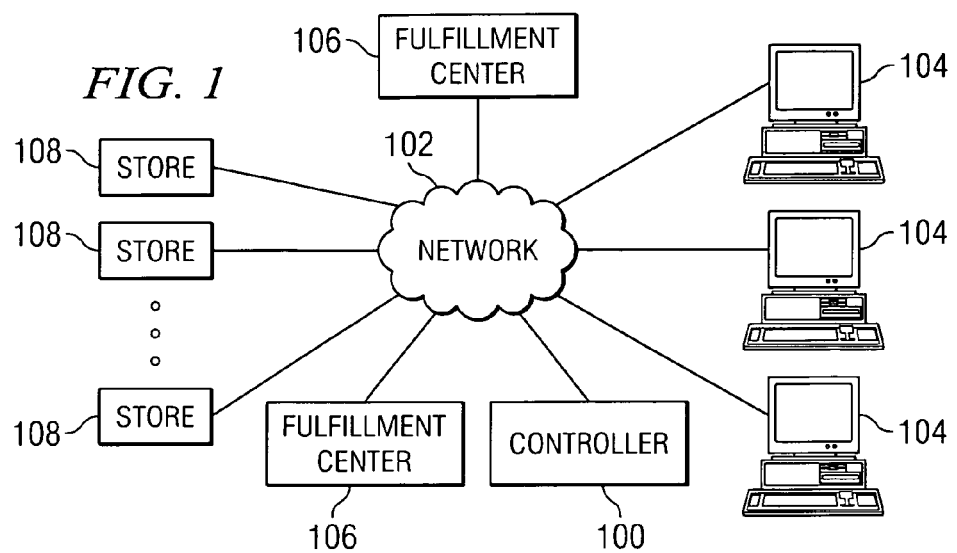
FIG. 1 illustrates a system that processes media requests and media returns.

FIG. 1 illustrates a system 10 that provides for processing media requests and media returns. System 10 includes a controller 100, a network 102, users 104, fulfillments centers 106, and stores 108. Users 104 interact with controller 100 through network 102 to request media, which may be fulfilled by fulfillment centers 106 or stores 108. Stores 108 may also fulfill traditional media rental requests from users who visit stores 108. Fulfillment centers 106 and stores 108 may be individually or collectively referred to as inventory locations.

According to the illustrated embodiment, system 10 includes controller 100 that selects an inventory location to fulfill a received media request. The media request may be to purchase media or rent media. As used herein, media represents any audio and/or visual information encoded in disks, compact disks (CDs), digital video disks (DVDs), or other memory device, or any audio and/or visual information encoded in a suitable format for electronic delivery to user 104 using network 102 (e.g., video-on-demand). In some embodiments, media may include movies, video games, music, books, recorded books, and/or any specific type or types of material operable to communicate audio and/or visual information. For example, controller 100 may include a Web site that accepts requests for delivery of movies to users 104.

Controller 100 represents an entity, such as a person, a group of persons, and/or any appropriate hardware or software, capable of delivering and/or arranging delivery of media to users 104. In some embodiments, controller 100 may include a Web server capable of hosting a computerized Web page that transmits and receives information through network 102. Controller 100 may also include telephony equipment, computers, databases, a cable headend, satellite links, media players, or any other appropriate hardware and/or software able to communicate with users 104, fulfillment centers 106, and stores 108 through network 102. Controller 100 may receive a request to rent media from user 104 that has an associated subscriber account. Controller 100 selects a fulfillment center 106 or a store 108 to fulfill the request of user 104.

Network 102 allows controller 100 to communicate with other networks, users 104, fulfillments centers 106, and/or stores 108. Network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Network 102 may include any combination of gateways, routers, hubs, switches, access points, base stations, and any other hardware and/or software that may implement any suitable protocol or communication.

Users 104 each represent an entity, such as a person, a group of persons, and/or any appropriate hardware or software, capable of requesting and/or receiving media by interacting with controller 100. In some embodiments, users 104 may include Web browsers capable of accessing a computerized Web page to communicate information through network 102. Users 104 may include telephony equipment, computers, or any other appropriate device able to communicate with controller 100 through network 102. For example, users 104 may transmit media requests to controller 100 through network 102.

Users 104 each may be associated with a subscriber account. The subscriber account includes information about a particular number of media items user 104 may request or use at a time. Each subscriber account has one or more associated slots that provide for the fulfillment of media requests. The subscriber account provides different manners in which users 104 may request and/or receive media, such as through an in-store channel or an on-line channel. For example, users 104 request media in-store by visiting stores 108 or on-line using a computer. An on-line media request may originate from a real-time request, or near real-time request that may include delays, from user 104 or through automatically processing a queue of requests previously configured by user 104. Upon fulfilling the media request, user 104 receives the requested media through any suitable channel, such as delivery of CDs, DVDs, or the like through the mail, by removing the media from store 108, or by electronic delivery of media to users 104 from controller 100, fulfillment centers 106, or stores 108 using network 102.

In one embodiment, user 104 may have an in-store subscriber account, an on-line subscriber account, or a blended subscriber account. An in-store subscriber account provides user 104 with an in-store experience. The in-store experience may allow user 104 to request media from store 108, purchase media from store 108, return media to store 108, or any suitable in-store transaction. An on-line subscriber account provides user 104 with an on-line experience. The on-line experience may allow user 104 to request media on-line using a computer, real-time or through a queue, purchase media on-line, receive media through the mail or electronic communication, or return media through the mail. The blended subscriber account provides user 104 with a blended experience that combines the in-store and on-line experiences. For example, user 104 may rent media in-store and on-line. In an embodiment, user 104 may have a pre-assigned allocation of media items (e.g., slots) between the in-store and on-line experiences. Alternatively, user 104 may have a general allocation that allows user 104 to have any suitable allocation between in-store and on-line experiences that varies over time to accommodate the needs of user 104.

Fulfillment centers 106 each represent, for example, a physical location, associated hardware, and/or software, capable of fulfilling requests or invoices for media. In some embodiments, fulfillment centers 106 may include technology capable of transmitting and receiving information through network 102, for example, telephony equipment, computers, databases, a cable headend, satellite links, media players, or any other appropriate hardware and/or software. Furthermore, fulfillment centers 106 may include warehouses and central distribution facilities that maintain physical inventory of media for use by fulfillment centers 106 or for supply to stores 108.

Stores 108 each represent, for example, a physical location, associated hardware, and/or software capable of fulfilling requests or invoices for media. In some embodiments, stores 108 may include technology capable of exchanging information through network 102, for example, telephony equipment, computers, databases, a cable headend, satellite links, media players, or any other appropriate hardware and/or software. Furthermore, stores 108 may include traditional movie and game rental operations, such as viewable shelves of media inventory and point-of-sale equipment, which accommodate in-store media requests. Stores 108 include media inventory 110$a$-110$c$ (generally referred to as inventory 110) that may be allocated based on the mode of fulfillment. For example, some of the media may be on-line inventory 110$a$ designated for users 104 who make on-line requests, while other media may be in-store inventory 110$b$ designated for users 104 that make in-store requests. Also, visiting inventory 110$c$ may represent media that belongs to or is otherwise associated with another store 108 or fulfillment center 106.

In operation, controller 100 interacts with users 104, fulfillment centers 106, and stores 108 through network 102 to engage in media experiences. Controller 100 receives an on-line request from user 104 or an indication that user 104 makes an in-store request. Controller 100 determines whether to fulfill the media request of user 104. Controller 100 determines the availability of a slot associated with the subscriber account of user 104. For example, if user 104 has an in-store subscriber account, controller 100 determines if user 104 has an in-store slot open. Upon determining whether the slot is open, controller 100 sends a message to fulfill the request or sends a message to deny the request. If user 104 has an open slot, an inventory location fulfills the request. Store 108 that receives the in-store request fulfills that request. However, controller 100 may use a variety of criteria to select an inventory location, fulfillment center 106 or store 108, to fulfill an on-line request. For a selected store 108, controller 100 may also determine whether to fulfill the request through on-line inventory 110$a$, in-store inventory 110$b$, or visiting inventory 110$c$. In fulfilling the request, controller 100 may prioritize visiting inventory 110$c$ to redirect visiting inventory 110$c$ to its home store 108 when user 104 returns the media. For a selected fulfillment center 106, controller 100 may determine whether to fulfill the request through general inventory 110 or visiting inventory 110$c$. If a slot is open, controller 100 closes the slot used to fulfill the request.

Controller 100 also processes media returns by users 104. Upon receiving a return, controller determines a media identification of the returned media. The media identification allows controller 100 to determine which inventory location to allocate the media and to determine the inventory classification of the media. Controller 100 increases the inventory count of the particular inventory, on-line inventory 110$a$, in-store inventory 110$b$, visiting inventory 110$c$, or general inventory 110, that corresponds to the returned media. Controller 100 also opens the slot of user 104 that is associated with the returned media.

System 10 contemplates various modifications, additions, or omissions. For example, controller 100 may receive the request from user 104 in any suitable manner, such as user 104 making a media request in store 108 or user 104 making a media request on-line. Moreover, one or more functions performed by controller 100 or network 102 may be implemented in whole or in part by fulfillment centers 106 or stores 108. Additionally, system 10 may include any number of controllers 100, networks 102, users 104, fulfillment centers 106, and stores 108. Any suitable logic comprising software, hardware, other logic, or any suitable combination of the preceding may perform the functions of any components in system 10.

Figure 2:
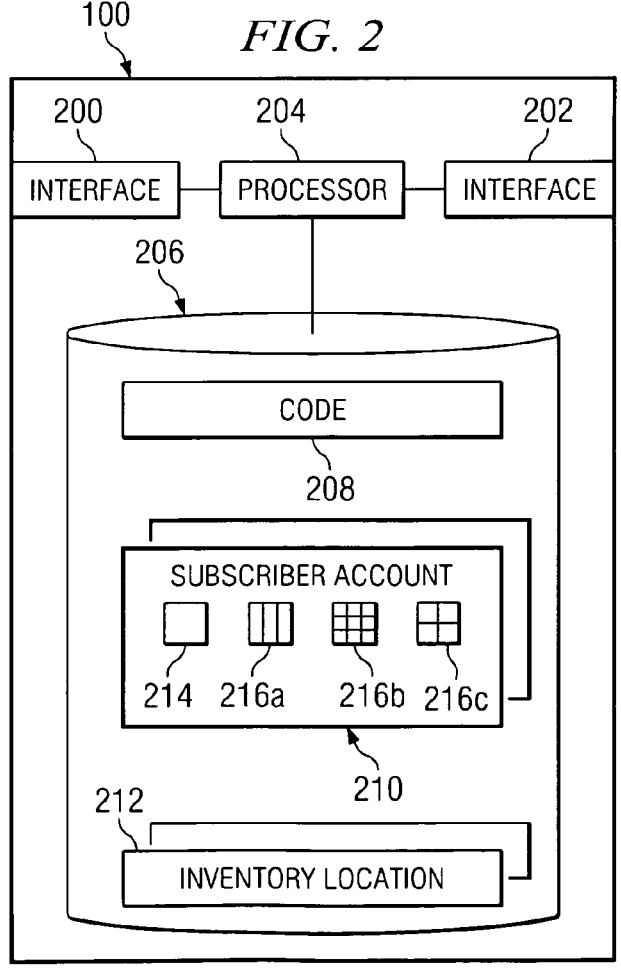
FIG. 2 illustrates a controller that supports the processing of media requests and media returns.

FIG. 2 is a block diagram illustrating functional components of a particular embodiment of controller 100. In general, controller 100 communicates with users 104, fulfillment centers 106, and stores 108 to identify and arrange fulfillment of media requests from users 104. More specifically, controller 100 selects one of several possible inventory locations to fulfill the request and generally manages the allocation of inventory 110 in system 10. In the illustrated embodiment, controller 100 includes interfaces 200 and 202, a processor 204, and a memory 206.

In the illustrated embodiment, interface 200 is an inventory location interface and interface 202 is a user interface. Interface 200 communicates with fulfillment centers 106 and stores 108, and interface 202 communicates with users 104. When communicating with users 104, interface 202 may exchange information regarding media requests, subscriber accounts, or other communication with users 104. When communicating with fulfillment centers 106 or stores 108, interface 200 may exchange information related to the fulfillment of media requests, media availability, inventory updates, inventory reallocation or other communication with stores 106 or fulfillment centers 108. Interface 200 and interface 202 represent any port or connection, real or virtual, including any suitable hardware and/or software that allow communication to and from elements linked to controller 100. Also, interfaces 200 and 202 may be a single interface or multiple interfaces depending on the particular configuration and design of controller 100.

Processor 204 controls the operation and administration of controller 100. For example, processor 204 processes information and/or commands received from interface 200, interface 202, and memory 206. Processor 204 includes any hardware and/or software that operate to control and process information. For example, processor 204 may be a microcontroller, a programmable logic device, a microprocessor, any suitable processing device, or any combination or number of the preceding. As discussed above, controller 100 may operate to host a Web page on the Internet.

Memory 206 stores, either permanently or temporarily, data and other information accessible by processor 204 and by interfaces 200 and 202. Memory 206 includes any one or a combination of volatile or nonvolatile local or remote devices suitable for storing information. For example, memory 206 may include random access memory (RAM), read only memory (ROM), magnetic storage devices, optical storage devices, or any other suitable information storage device or combination of these devices. Memory 206 may store information in one or more modules. For example, in the illustrated embodiment, memory 206 includes code 208, subscriber account 210, and inventory information 212. While memory 206 as illustrated includes particular data elements, it should be understood that memory 206 may maintain any suitable information for use in operation of controller 100.

Code 208 includes software, executable files, Web pages, graphical user interfaces (GUIs) and/or appropriate logic modules capable when executed to control the operation of controller 100. For example, code 208 may include Web pages for presentation to users 104 to manage their media requests. Code 208 may also include executable files capable of processing delivery requests, inventory queries, inventory reallocations, and other functions for fulfillment centers 106 and/or stores 108.

Subscriber account 210 includes information related to each particular user 104. For example, subscriber account 210 may include historical rental activity, account balances, user preferences, payment information, user satisfaction scores, media selections of user 104, and other information specific to the account for user 104. Subscriber account 210 may include queues 214 that have information related to media selections by users 104. The media selections that users 104 store in its associated queue 214 allow queue 214 to make media requests on behalf of users 104. Therefore, users 104 may make the media selections in advance of actually requesting the media. For example, users 104 may configure queue 214 to include a certain number of media selections or pending requests. When a slot is open, controller 100 processes queue 214 and selects an inventory location to fulfill the next request. Users 104 may include any suitable number of pending requests in queue 214.

Subscriber account 210 also may include such information as a total number of media items user 104 may rent at a time. For example, subscriber account 210 has an associated monthly fee that allows user 104 to rent up to three media items at a time. Upon the return of a media item by user 104, system 10 fulfills the next media request. In this example, user 104 pays for three slots that are closed upon fulfilling a media request (in-store or on-line) and opened upon return of a media item. Each user 104 has one or more slots 216 associated with their subscriber account 210 that allow user 104 to have media requests fulfilled. Slots 216 include in-store slots 216a, on-line slots 216b, and blended slots 216c. In-store slots 216a associate with in-store subscriber accounts and provide for the fulfillment of in-store media requests. On-line slots 216b associate with on-line subscriber accounts and provide for the fulfillment of on-line media requests. Blended slots 216c associate with blended subscriber accounts and provide for the fulfillment of in-store and on-line media requests. System 10 may pre-allocate how slots 216 will be used. For example, user 104 may have four total slots 216, two slots 216 for in-store use and two slots 216 for on-line use. Alternatively, user 104 may have blended slots 216c as needed on-line or in-store. For example, if user 104 has four total slots 216, user 104 may use the oprn slots 216 in-store or on-line up to the total limit.

Inventory information 212 indicates information about each inventory location. In an embodiment, inventory information indicates the availability of media at fulfillment centers 106 and stores 108. For example, inventory information 212 includes the identity and geographic locations of inventory locations (fulfillment centers 106 and stores 108) in system 10. Inventory information 212 maintains a count of different types of inventories 110 for each media title at each inventory location. Inventory information 212 may also include information regarding the store performance of stores 108, including a maximum number of on-line fulfillments allowed at store 108, accuracy and efficiency in meeting on-line requests, accounting information to credit revenue to store 108 for fulfilling on-line requests, and other similar information. Controller 100 updates inventory information 212 based on fulfilled requests, returned media, inventory updates and reconciliations, and other communications and activities in system 10. Thus, inventory information 212 may be based upon actual inventories. Alternatively or in addition, inventory information 212 may be based upon projections and forecasts of future inventories.

In operation, controller 100 receives a media request from a user 104. The request may be received through interface 202 or retrieved from queue 214. Upon receiving the request, controller 100 determines whether slot 216 associated with user 104 is open. Upon determining that user 104 has an open slot, controller 100 sends a message to fulfill the request at a selected inventory location. If user 104 makes an in-store media request, controller 100 selects store 108 that received the request to fulfill the request. However, if user 104 makes an on-line media request, controller 100 considers various factors to select the inventory location.

Controller 100 analyzes several factors to determine which inventory location to select. The selection may be based on enhancing the user experience, such as quickly providing user 104 with the media from the closest inventory location. For example, controller 100 may consider subscriber account 210 and inventory information 212 in determining which inventory location to select. Subscriber account 210 provides controller 100 information regarding user 104 that makes the request, and inventory information 212 provides controller 100 with information regarding inventory locations and available media. For example, from subscriber account 210, controller 100 determines the user's location and from inventory information 212, controller 100 determines a location near the user that has available inventory 110.

Controller 100 may be configured to select the inventory location based on a number of factors, such as user satisfaction criteria, inventory type, store metrics, other suitable factors, or any combination of the preceding. For example, controller 100 may select the inventory location that will provide the media to user 104 in the shortest time. This inventory location may be the closest store 108 to user 104 or store 108 that has the media immediately available. Also, controller 100 may consider several pending requests in queue 214 of user 104 to select one that is the most beneficial or optimal to fulfill.

Controller 100 may also consider the various types of inventory 110 at stores 108 in selecting the inventory location. Controller 100 may prioritize visiting inventory 110c over on-line inventory 110a. In an attempt to return visiting inventory 110c to its home store 108, controller 100 may select store 108 with more available visiting inventory 110c. Within fulfillment centers 106, controller 100 may prioritize visiting inventory 110c over general inventory 110. Controller 100 may also select the inventory location based on store metrics. For example, store rankings on efficiency, accuracy of on-line fulfillment, or any suitable metric may determine which inventory location controller 100 selects. Additionally, the revenue credited to stores 108 for fulfilling on-line requests may influence a selection based on store metrics.

Based on these or other factors, controller 100 qualifies available inventory locations and applies a ranking, weighting of factors, or other algorithm to select the inventory location. Controller 100 then selects the inventory location to fulfill the request and the selected inventory location fulfills the request.

Modifications, additions, or omissions may be made to controller 100. For example, memory 206 may include information in addition to code 208, subscriber account 210, and inventory information 212. As another example, controller 100 may include additional interfaces to allow for communication between other elements within system 10. Additionally, any suitable logic, comprising software, hardware, other logic, or any suitable combination of the preceding in any component or location of system 10 may perform the functions of controller 100.

FIG. 3 is a flowchart 30 for processing an in-store media request. At step 300, controller 100 receives an indication that user 104 makes an in-store request at store 108. Controller 100 determines whether user 104 has an in-store subscriber account or a blended subscriber account at step 302. An in-store subscriber account provides user 104 with an in-store experience. The in-store experience includes requesting media from store 108, returning media to store 108, purchasing media from store 108, or any suitable in-store transaction. A blended subscriber account provides user 104 with a combination of in-store and on-line experiences. In addition to the options of the in-store experience, user 104 with a blended subscriber account may rent media on-line, purchase media on-line, return media through the mail, or any suitable on-line transaction.

If user 104 has an in-store subscriber account, controller 100 executes steps 32. First, controller 100, store 108, or any suitable entity checks store 108 locally to determine how to respond to the media request of user 104 at step 304. If slot 216 associated with user 104 is not open at step 306, the in-store request is denied at step 308. For example, if user 104 has an in-store subscriber account with three slots 216, but has filled slots 216 by renting three movies that have not been returned, the in-store request is denied until user 104 returns a movie and slot 216 opens. If in-store slot 216a is open, the in-store request is fulfilled at step 310. After fulfilling the in-store request, system 10 closes in-store slot 216a at step 312 to update the subscriber account.

When controller 100 determines that user 104 has a blended subscriber account, controller 100 executes steps 34. At step 314, controller 100 accesses subscriber account 210 associated with user 104 to determine if a slot is open. Accessing subscriber account 210 includes retrieving one or more pieces of information. Controller 100 determines whether blended slot 216c is open at step 316. If user 104 does not have blended slot 216c open, controller 100 sends a message to deny the in-store request at step 318. On the other hand, if user 104 has blended slot 216c open that is allocated for in-store use or is generally allocated, controller 100 sends a message to fulfill the in-store request at step 320. If user 104 makes an in-store request that corresponds to a pending request in queue 214, controller 100 removes the request from queue 214. For example, if user 104 attempts to rent a movie title in-store that also appears on queue 214 associated with user 104, controller 100 removes the movie title from queue 214 to prevent user 104 from receiving a duplicate movie. Controller 100 then closes blended slot 216c associated with user 104 at step 324.

Modifications, additions, or omissions may be made to flowchart 30. For example, any suitable component may perform any or all the steps performed by controller 100. As another example, flowchart 30 may accommodate multiple in-store requests from user 104. Instead of determining slot whether a slot is open for one request, controller 100 or other suitable entity determines whether user 104 has the appropriate number of slots 216 open to correspond to the number of requests. If user 104 makes more than one request, the requests may be denied individually and not as a group of requests. For example, if user 104 makes three in-store requests, but only has two blended slots open, controller 100 will send a message to fulfill two of the in-store requests and to deny one of the in-store requests. Additionally, steps may be performed in any suitable order.

FIG. 4 is a flowchart 40 for processing an on-line media request. Controller 100 receives an on-line media request from user 104 at step 400. User 104 may make the request in real-time or integrated queue 214 may request the media on behalf of user 104. At step 402, controller 100 determines whether user 104 has an on-line subscriber account or a blended subscriber account.

If user 104 has an on-line subscriber account, controller 100 executes steps 42. Controller 100 accesses subscriber account 210 associated with user 104 at step 402. At step 406, controller 100 determines whether an on-line slot 216b is open. If user 104 does not have an on-line slot 216b open, controller 100 denies the on-line request at step 408. However, if user 104 has an on-line slot 216b open, controller 100 sends a message to fulfill the on-line request at step 410. Controller 100 may prioritize inventory 110 to fulfill the media request from the selected inventory location. For example, if controller 100 selects a store 108 to fulfill the on-line request, controller 100 may first select visiting inventory 110c, then on-line inventory 110a, and possibly in-store inventory 110b. Controller 100 may prioritize visiting inventory 110c over general inventory 110 if controller 100 selects fulfillment center 106 to fulfill an on-line request. If the on-line request corresponds to a pending request in queue 214, controller 100 removes the request from queue 214 at step 412. Controller 100 closes on-line slot 216b associated with user 104 at step 414.

When controller 100 determines that user 104 has a blended subscriber account, controller 100 executes steps 44. At step 416, controller 100 accesses subscriber account 210 of user 104 to determine if slot 216 is open. Controller 100 determines whether blended slot 216c allocated for on-line use or generally allocated is open at step 418. If user 104 does not have blended slot 216c open, controller 100 denies the on-line request at step 420. On the other hand, if user 104 has blended slot 216 open, controller 100 sends a message to fulfill the on-line request at step 422. Controller 100 may prioritize inventory 110 to fulfill the media request from the selected inventory location. If the on-line request corresponds to a pending request in queue 214, controller 100 removes the request from queue 214 at step 424. Controller 100 closes blended slot 216c associated with user 104 at step 426.

Modifications, additions, or omissions may be made to flowchart 40. For example, any suitable component may perform any or all the steps performed by controller 100. As another example, flowchart 40 may accommodate multiple on-line requests from user 104. Controller 100 may process the requests in parallel, sequentially, or in any suitable order. Additionally, steps may be performed in any suitable order.

FIG. 5 is a flowchart for processing a media return. Controller 100 receives a return indication at step 500 that user 104 has returned the media. The return indication may occur when user 104 returns media to store 108, when user 104 mails media to an inventory location, when the media arrives at a mail location, when an inventory location receives the mailed media, or at any suitable time. Controller 100 determines the media identification at step 502. The media identification provides controller 100 with the particular media title, the home location of the media title, user 104 that rented the media, and any suitable information controller 100 may use to replenish inventory 110. At step 504, controller 100 determines the inventory location to which user 104 returns the media. If user 104 returns the media to fulfillment center 106 through the mail, controller 100 determines the inventory classification of the media at step 506. For example, if user 104 mistakenly returns media that belongs to store 108 to fulfillment center 106, controller 100 classifies the media as visiting inventory 110c. Media may be classified as general inventory 110, visiting inventory 110c, or any suitable classification as determined by controller 100. Upon determining the inventory classification, controller 100 increases the amount of particular inventory, general inventory 110 or visiting inventory 110c, corresponding to the received media. For example, user 104 receives media through the mail and returns the media using a pre-addressed return envelope that goes to fulfillment center 106. The media returned by user 104 is general inventory 110 because user 104 returned the media to the home inventory location. Therefore, controller 100 increases the general inventory count of that particular media title.

If user 104 returns media to store 108, controller 100 determines the inventory classification at step 510. Media within store 108 may be classified as on-line inventory 110a, in-store inventory 110b, or visiting inventory 110c. At step 512, controller increases the particular amount of inventory 110 corresponding to the returned media.

In the illustrated embodiment, controller. 100 determines which slot 216 to release in response to the return indication. Controller 100 determines whether the returned media is associated with an in-store slot 216a at step 514. If the return is associated with in-store slot 216a, controller 100 opens in-store slot 216a at step 516, which allows user 104 to have additional requests fulfilled. If the return is not associated with in-store slot 216a, controller 100 opens slot 216, on-line slot 216b or blended slot 216c, associated with the return at step 518. The determined media identification provides the subscriber account of user 104 that returns the media and provides controller 100 with the corresponding type of slot 216. For on-line slots 216b and blended slots 216c, controller 100 processes queue 214 at step 520 to determine whether additional requests need to be fulfilled for user 104.

Modifications, additions, or omissions may be made to flowchart 50. For example, any suitable component may perform any or all the steps performed by controller 100. Controller 100 may process the requests in parallel, sequentially, or in any suitable order.

FIG. 6 is a flowchart 60 for establishing a subscriber account to process media requests. At step 150, information is received from a user 104 to establish a subscriber account. The information may include any suitable material that allows a user to establish a subscriber account, such as a name of user 104, an address of user 104, credit card information of user 104, a number of slots associated with the subscriber account, or other suitable information.

User 104 determines the number of slots to associate with the subscriber account. The fee associated with the subscriber account may adjust depending on the number and/or type of slots associated with the subscriber account. For example, a subscriber account with five associated slots may be more expensive than a subscriber account with three associated slots. Also, the relative cost (e.g., monthly fee) may be different depending on whether slots are designated as in-store, on-line and/or blended. The information that user 104 provides in step 150 may also include an allocation of slots between an on-line and in-store experience. For example, user 104 may have three total slots and designate one of the three slots as in-store and designate two of the three slots as on-line. In an embodiment, user 104 allocates the slots between at least one on-line slot and at least one in-store slot. Accordingly, user 104 may selectively establish parameters for the subscriber account to use different experiences to process the media requests.

User 104 receives a confirmation that the subscriber account is activated to provide both an on-line experience and an in-store experience at step 152. At step 154, a media request is received from user 104. User 104 confirms fulfillment of the media request through an on-line or in-store experience at step 156. User 104 may adjust the information in the associated subscriber account at step 158. For example, user 104 may adjust the number of slots for processing media requests. If user 104 originally activates the subscriber account to have three associated slots, user 104 may increase the number of slots to five or decrease the number of slots to two. User 104 may have any suitable number and/or types of slots associated with the subscriber account. As another example, user 104 may adjust the allocation of slots between on-line and in-store. For example, if user 104 originally allocates one in-store slot and two on-line slots, user 104 may later change the allocation to two in-store slots and one on-line slot. Although described in a particular sequence, flowchart 60 may perform steps serially or in parallel in any order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for processing media requests, comprising:
   receiving, at a computer, a media request associated with a subscriber account; and
   determining, at the computer, availability of one of a plurality of slots associated with the subscriber account, wherein the slots comprise at least one in-store slot and at least one on-line slot.

2. The method of claim 1, wherein the subscriber account provides both an in-store experience and an on-line experience.

3. The method of claim 2, wherein:
   the in-store experience comprises receiving a media request from an in-store user and receiving a return indication from a store; and
   the on-line experience comprises receiving a media request on-line and receiving a return indication of media transmission through a mail delivery.

4. The method of claim 1, further comprising sending a message to fulfill the media request if the slot associated with the subscriber account is open.

5. The method of claim 4, further comprising removing the media request from a queue that contains a plurality of pending requests associated with the subscriber account.

6. The method of claim 1, further comprising sending a message to deny the media request if the slot associated with the subscriber account is closed.

7. The method of claim 1, further comprising:
   receiving a return indication that media has been returned to an inventory location;
   increasing an inventory count associated with the returned media for the inventory location that receives the media; and
   opening a slot associated with the subscriber account.

8. The method of claim 7, wherein increasing an inventory count comprises increasing a visiting inventory count.

9. The method of claim 7, further comprising processing a pending request in a queue associated with the subscriber account.

10. A system for processing media requests, comprising:
    a plurality of computers operable to make a plurality of media requests associated with a plurality of subscriber accounts; and
    hardware comprising a controller operable to receive the media requests and, for each received media request associated with a subscriber account, determine availability of one of a plurality of slots associated with the subscriber account, wherein the slots comprise at least one in-store slot and at least one on-line slot.

11. The system of claim 10, wherein the controller is operable to select a plurality of inventory locations to fulfill the media requests, wherein at least one of the inventory locations accommodates in-store media rental requests.

12. The system of claim 11, wherein the plurality of inventory locations comprise:
    a plurality of stores to accommodate in-store media requests; and
    a plurality of fulfillment centers to accommodate on-line media requests.

13. The system of claim 10, wherein the subscriber account provides both an in-store experience and an on-line experience.

14. The system of claim 13, wherein:
    the in-store experience comprises receiving a media request from an in-store user and receiving a return indication from a store; and
    the on-line experience comprises receiving a media request on-line and receiving a return indication of media transmission through a mail delivery.

15. The system of claim 10, wherein the controller is operable to send a message to fulfill the media request if the slot associated with the subscriber account is open.

16. The system of claim 10, wherein the controller is operable to remove the media request from a queue that contains a plurality of pending requests associated with the subscriber account.

17. The system of claim 10, wherein the controller is operable to send a message to deny the media request if the slot associated with the subscriber account is closed.

18. The system of claim 10, wherein the controller is operable to receive a return indication that media has been returned to an inventory location, increase an inventory count associated with the returned media for the inventory location that receives the media, and open a slot associated with the subscriber account.

19. The system of claim 18, wherein increasing an inventory count comprises increasing a visiting inventory count.

20. The system of claim 18, wherein the controller is operable to process a pending request in a queue associated with the subscriber account.

21. A controller, comprising:
    a memory operable to store a plurality of subscriber accounts;
    hardware comprising a network interface operable to receive a media request; and
    a processor operable to associate the media request with a particular subscriber account, the processor further operable to determine availability of one of a plurality of slots associated with the particular subscriber account, wherein the slots comprise at least one in-store slot and at least one on-line slot.

22. The controller of claim 21, wherein the processor is operable to send a message to fulfill the media request if the slot associated with the subscriber account is open.

23. The controller of claim 22, wherein the processor is operable to remove the media request from a queue that contains a plurality of pending requests associated with the subscriber account.

24. The controller of claim 21, wherein the processor is operable to send a message to deny the media request if the slot associated with the subscriber account is closed.

25. The controller of claim 21, wherein the processor is operable to receive a return indication that media has been returned to an inventory location, increase an inventory count associated with the returned media for the inventory location that receives the media, and open a slot associated with the subscriber account.

26. The controller of claim 25, wherein increasing an inventory count comprises increasing a visiting inventory count.

27. The controller of claim 21, wherein the processor is operable to process a pending request in a queue associated with the subscriber account.

28. A system for processing media requests, comprising:
    means for receiving a media request associated with a subscriber account; and
    means for determining availability of one of a plurality of slots associated with the subscriber account, wherein the slots comprise at least one in-store slot and at least one on-line slot.

29. A method for processing media requests, comprising:
    receiving, at a computer, a media request associated with a subscriber account; and determining, at the computer, availability of one of a plurality of slots associated with the subscriber account, wherein the slots comprise at least one blended slot.

30. The method of claim 29, wherein the subscriber account provides both an in-store experience and an on-line experience.

31. The method of claim 30, wherein:
the in-store experience comprises receiving a media request from an in-store user and receiving a return indication from a store; and
the on-line experience comprises receiving a media request on-line and receiving a return indication of media transmission through a mail delivery.

32. The method of claim 29, further comprising:
sending a message to fulfill the media request if the slot associated with the subscriber account is open.

33. The method of claim 32, further comprising removing the media request from a queue that contains a plurality of pending requests associated with the subscriber account.

34. The method of claim 29, further comprising sending a message to deny the media request if the slot associated with the subscriber account is closed.

35. The method of claim 29, further comprising:
receiving a return indication that media has been returned to an inventory location;
increasing an inventory count associated with the returned media for the inventory location that receives the media; and
opening a slot associated with the subscriber account.

36. The method of claim 35, wherein increasing an inventory count comprises increasing a visiting inventory count.

37. The method of claim 35, further comprising processing a pending request in a queue associated with the subscriber account.

38. A system for processing media requests, comprising:
a plurality of computers operable to make a plurality of media requests associated with a plurality of subscriber accounts; and
hardware comprising a controller operable to receive the media requests and, for each received media request associated with a subscriber account, determine availability of one of a plurality of slots associated with the subscriber account, wherein the slots comprise at least one blended slot.

39. The system of claim 38, wherein the controller is operable to select a plurality of inventory locations to fulfill the media requests, wherein at least one of the inventory locations accommodates in-store media rental requests.

40. The system of claim 38, wherein the plurality of inventory locations comprise:
a plurality of stores to accommodate in-store media requests; and
a plurality of fulfillment centers to accommodate on-line media requests.

41. The system of claim 38, wherein the subscriber account provides both an in-store experience and an on-line experience.

42. The system of claim 41, wherein:
the in-store experience comprises receiving a media request from an in-store user and receiving a return indication from a store; and
the on-line experience comprises receiving a media request on-line and receiving a return indication of media transmission through a mail delivery.

43. The system of claim 38, wherein the controller is operable to send a message to fulfill the media request if the slot associated with the subscriber account is open.

44. The system of claim 38, wherein the controller is operable to remove the media request from a queue that contains a plurality of pending requests associated with the subscriber account.

45. The system of claim 38, wherein the controller is operable to send a message to deny the media request if the slot associated with the subscriber account is closed.

46. The system of claim 38, wherein the controller is operable to receive a return indication that media has been returned to an inventory location, increase an inventory count associated with the returned media for the inventory location that receives the media, and open a slot associated with the subscriber account.

47. The system of claim 46, wherein increasing an inventory count comprises increasing a visiting inventory count.

48. The system of claim 46, wherein the controller is operable to process a pending request in a queue associated with the subscriber account.

49. A controller, comprising:
a memory operable to store a plurality of subscriber accounts;
hardware comprising a network interface operable to receive a media request; and
a processor operable to associate the media request with a particular subscriber account, the processor further operable to determine availability of one of a plurality of slots associated with the particular subscriber account, wherein the slots comprise at least one blended slot.

50. The controller of claim 49, wherein the processor is operable to send a message to fulfill the media request if the slot associated with the subscriber account is open.

51. The controller of claim 50, wherein the processor is operable to remove the media request from a queue that contains a plurality of pending requests associated with the subscriber account.

52. The controller of claim 49, wherein the processor is operable to send a message to deny the media request if the slot associated with the subscriber account is closed.

53. The controller of claim 49, wherein the processor is operable to receive a return indication that media has been returned to an inventory location, increase an inventory count associated with the returned media for the inventory location that receives the media, and open a slot associated with the subscriber account.

54. The controller of claim 53, wherein increasing an inventory count comprises increasing a visiting inventory count.

55. The controller of claim 49, wherein the processor is operable to process a pending request in a queue associated with the subscriber account.

56. The method of claim 2, wherein the in-store experience comprises providing viewable shelves of media inventory and point-of-sale equipment to accommodate an in-store media request.

* * * * *